United States Patent
Poppert

(10) Patent No.: US 6,182,036 B1
(45) Date of Patent: Jan. 30, 2001

(54) METHOD OF EXTRACTING FEATURES IN A VOICE RECOGNITION SYSTEM

(75) Inventor: Daniel Charles Poppert, Woodstock, IL (US)

(73) Assignee: Motorola, Inc., Schaumburg, IL (US)

(*) Notice: Under 35 U.S.C. 154(b), the term of this patent shall be extended for 0 days.

(21) Appl. No.: 09/256,280

(22) Filed: Feb. 23, 1999

(51) Int. Cl.[7] .................................................. G10L 15/06
(52) U.S. Cl. .......................................... 704/243; 704/206
(58) Field of Search ................................... 704/243, 206, 704/201

(56) References Cited

U.S. PATENT DOCUMENTS

| 5,097,509 | * | 3/1992 | Lennig | 704/240 |
| 6,029,124 | * | 2/2000 | Gillick et al. | 704/200 |

FOREIGN PATENT DOCUMENTS

0192898 A1   3/1986   (EP) ..................... 704/240

OTHER PUBLICATIONS

Hunt, M. J., and Lefebvre, C., "A Comparison of Several Acoustic Representations for Speech recognition with Degraded and Undegraded Speech," 1989 Int. Conf. Acoust. Speech Sig. Proc. ICASSP–89, vol. 1, pp. 262–265, 23–26 May 1989.*

* cited by examiner

Primary Examiner—David R. Hudspeth
Assistant Examiner—Donald L. Storm
(74) Attorney, Agent, or Firm—Randall S. Vaas; Michael C. Soldner

(57) ABSTRACT

A method of extracting features for a voice recognition system of a wireless communication device. The wireless communication device includes a transmitter and a receiver coupled to a call processor, a microphone for inputting audible sounds, and an analog-to-digital converter coupled to the microphone to output digital signals. The call processor includes a coefficient generator coupled to the analog-to-digital converter and generating representative coefficients, a differentiator coupled to the coefficient generator to generate delta coefficients, and an extractor outputting a portion of the representative coefficients and the delta coefficients as a feature vector for use in voice recognition, wherein every other representative coefficient is used in the feature vector.

8 Claims, 3 Drawing Sheets

| CONDITION | NO DELTA-CEPSTRAL FEATURES | TRUNCATED FEATURES (N=6) | EXTRACTED FEATURE VECTOR |
|---|---|---|---|
| OFFICE (PHONE HELD NEXT TO EAR) | 99.2% | 99.5% | 99.3% |
| OFFICE (PHONE HELD OUT IN FRONT OF FACE) | 99.0% | 99.2% | 98.5% |
| CAR AT IDLE (PHONE HELD NEXT TO EAR) | 98.7% | 98.6% | 98.6% |
| HANDSFREE IN CAR AT IDLE | 94.6% | 94.9% | 96.8% |
| HANDSFREE IN CAR AT 30 MPH | 88.8% | 89.7% | 92.5% |
| HANDSFREE IN CAR AT 55 MPH | 71.9% | 75.5% | 81.2% |

METHOD OF EXTRACTING FEATURES IN A VOICE RECOGNITION SYSTEM

FIELD OF THE INVENTION

The present invention pertains to voice recognition, and more particularly to feature extraction in a voice recognition system.

BACKGROUND OF THE INVENTION

In a speaker dependent speech recognition system, users must enroll the vocabulary words they wish to have available when using the system. A vocabulary "word" can be a single spoken word or a short phrase, and the vocabulary words chosen depend on the particular application. For example, a speech recognition implementation for a portable radiotelephone might require the user to provide the names and locations of frequently called people (e.g., "Fred's office"), or commands for frequently used features usually available in a user interface (e.g., "battery meter", "messages", or "phone lock").

During an enrollment procedure, a speech recognition system is responsive to the user's input to derive a representative template for each vocabulary word. In some systems, this template can be represented by a hidden Markov model (HMM) which consists of a series of states. Each state represents a finite section of a speech utterance: utterance as used herein referring to a "vocabulary word" which may comprise one or more words. A statistical representation of each state of an HMM is calculated using one or more enrollment speech samples of a particular vocabulary word uttered by the user. This is accomplished through frame-to-state assignments.

Such state assignments are used both for training and voice recognition modes of operation. In particular, the assigned states are used to create models in a training mode which are used as a comparison reference during speech recognition mode. The assignments for input utterances in a voice recognition mode of operation are used to compare the input utterances to stored reference models during the voice recognition mode.

An alignment algorithm, such as a Viterbi algorithm is used for frame-to-state alignment of an utterance. This alignment algorithm, which provides the best match of the speech utterance onto the model, is used to assign each frame of the vocabulary word utterance to individual states of the model. Using this assignment, the statistical representations for each state can be refined.

Because of the amount of information, most speech recognition systems require large amounts of both volatile memory, such as random access memory (RAM), and non-volatile memory (NVM), such as flash ROM or electronically erasable read only memory (EEPROM). These memory requirements can be prohibitively expensive for cost-sensitive applications such as portable wireless communication devices. Additionally, speech recognition systems require significant computational requirements measured in millions of instructions per second (MIPS). The large number of MIPS are required for training and voice recognition. This large MIPS requirement can negatively impact the performance of the device in which voice recognition is employed by using valuable resources and slowing down operating speeds.

In order to implement a speaker dependent training and recognition algorithm on a portable device, such as wireless communication device where very little random access memory (RAM) is available, there is a need for a method that supports a smaller memory and uses fewer MIPS without significantly negatively impacting on recognition in all environments.

DETAILED DESCRIPTION OF THE DRAWINGS

A novel feature extraction technique produces smaller feature vectors used to represent input sound, thereby reducing the memory size necessary to represent an utterance. The method significantly reduces: volatile memory, such as RAM, requirements; NVM, such as EEPROM, requirements; and MIPS requirements for speech recognition algorithms by using a smaller feature vector to represent each utterance. Although the description presented here is an example of isolated-word speaker-dependent speech recognition systems using Hidden Markov Models (HMMs), the invention can be applied to a wide variety of speech recognition applications, including speaker-independent, connected-word speech recognition systems, and could also apply to other speech recognition algorithms, such as dynamic time warping.

Figure 1:
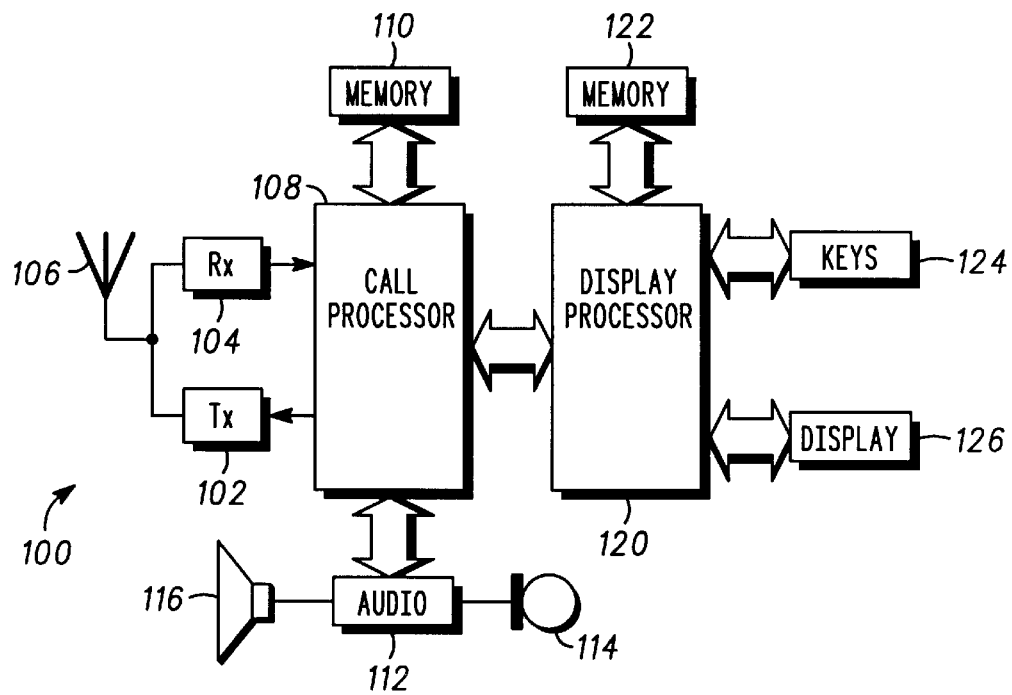
FIG. 1 is a circuit schematic in block diagram form illustrating a wireless communication device.

A device 100, in which the invention can be advantageously employed is disclosed in FIG. 1. The device 100 is described to be a portable radiotelephone herein for illustrative purposes, but could be a computer, a personal digital assistant, or any other device that can advantageously employ voice recognition, and in particular a device which can take advantage of a memory efficient voice recognition system. The illustrated radiotelephone includes a transmitter 102 and a receiver 104 coupled to an antenna 106. The transmitter 102 and receiver 104 are coupled to a call processor 108, which performs call processing functions. The call processor 108 can be implemented using a digital signal processor (DSP), a microprocessor, a microcontroller, a programmable logic unit, a combination of two or more of the above, or any other suitable digital circuitry.

The call processor 108 is coupled to a memory 110. Memory 110 contains RAM, electronically erasable programmable read only memory (EEPROM), read only memory (ROM), flash ROM, or the like, or a combination of two or more of these memory types. The memory 110 supports operation of the call processor 108, including the voice recognition operation, and should include an electronically alterable memory to support the state transition path memory. The ROM can be provided to store the device operating programs.

An audio circuit 112 provides digitized signals from a microphone 114 to call processor 108. The audio circuit 112 drives speaker 116 responsive to digital signals from the call processor 108.

The call processor 108 is coupled to a display processor 120. The display processor is optional if additional processor support is desired for the device 100. In particular, the display processor 120 provides display control signals to the display 126 and receives inputs from keys 124. The display processor 120 can be implemented using a microprocessor, a microcontroller, a digital signal processor, a programmable logic unit, a combination thereof, or the like. A memory 122 is coupled to the display processor to support the digital logic therein. The memory 122 can be implemented using RAM, EEPROM, ROM, flash ROM, or the like, or a combination of two or more of these memory types.

Figure 2:
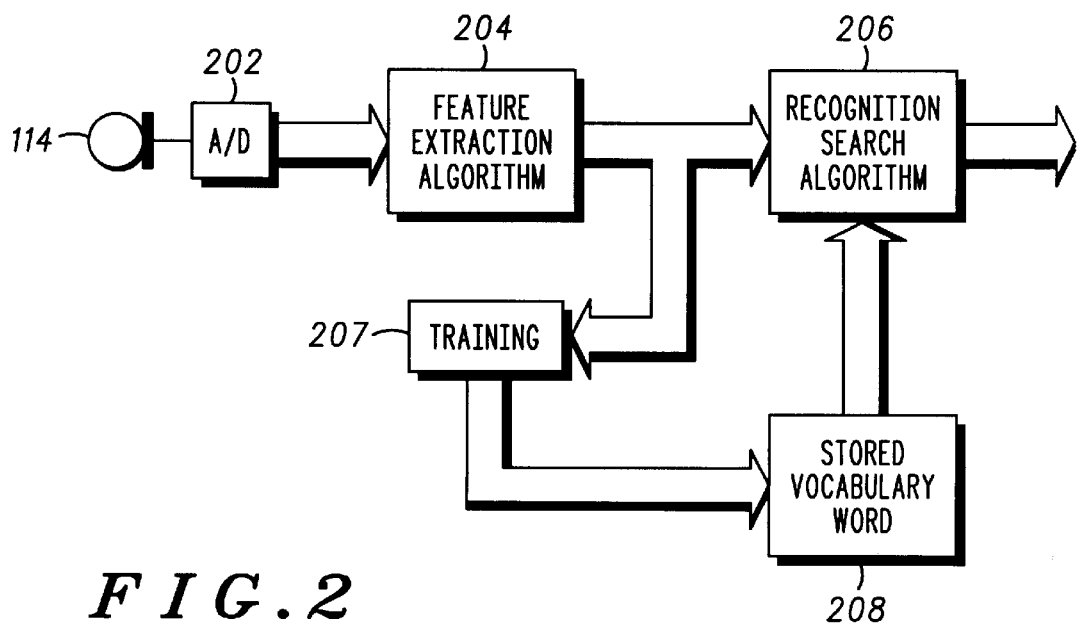
FIG. 2 is a circuit schematic in block diagram form illustrating a voice recognition input.

With reference to FIG. 2, the audio signals received by microphone 114 are converted to digital signals in an analog-to-digital converter 202 of audio circuit 112. Those skilled in the art will recognize that the audio circuit 112 provides additional signal processing, such as filtering, which are not described herein for brevity. The call processor, 108, performs feature extraction 204 on the processed digital signal representation of the analog signal output by microphone 114 and produces a set of feature vectors representative of the user utterance. A feature vector is produced for each short time analysis window. The short time analysis window is a frame, which in the example illustrated herein is 20 ms. Thus there is one feature vector per frame. The processor 108 uses the features for speech recognition 206 or training 207.

In training, the feature vectors of the utterance are used to create templates in the form of HMMs, which are stored in memory 208. In speech recognition, the feature vectors representing the input utterance are compared to the templates of stored vocabulary words in memory 208 to determine what the user said. The system may output the best match, a set of the best matches, or optionally, no match. Memory 208, is preferably a non-volatile memory portion of memory 110 (FIG. 1), and may for example be an EEPROM or flash ROM. As used herein, "words" can be more than one word, such as "John Doe," or a single word such as "call".

The feature extractor 204, generally performs signal processing on a frame of the input speech, and outputs feature vectors representing each frame at the frame rate. The frame rate is generally between 10 and 30 ms, and may for example be 20 ms in duration. Trainer 207 uses the features extracted from the sampled speech of one or more utterances of a word or phrase to generate parameters for a model of that word or phrase. This model is then stored in a model storage non-volatile memory 208. The model size is directly dependent upon the feature vector length, such that a longer feature vector length requires a larger memory.

The models stored in memory 208 are then used during recognition 206. The recognition system performs a comparison between the features of an unknown utterance and stored model parameters to determine the best match. The best matching model is then output from the recognition system as the result.

Several types of features have been effectively used as outputs of the feature extraction shown in block 204. Some early speech recognition systems used filter bank energies. For example, for each frame of data, the amount of energy in each of fourteen filters of a filter bank would be passed to the training or recognition software at the frame rate, which is every 20 ms. Linear prediction coding (LPC) parameters have also been used effectively. Many modem systems use Mel-Frequency Cepstral Coefficients (MFCCs), which are cepstral coefficients calculated using the warped Mel-Frequency scale. Recognition results can be improved through the additional use of delta-MFCCs, which are simply an estimate of the time derivative of the MFCCs.

The use of MFCCs and delta-MFCCs in speech recognition systems is well known. As will be illustrated later, it is desirable to have a feature vector which gives recognition performance on par with the combined MFCC and delta-MFCC feature vector, but at the same time is much shorter than combined MFCC and delta-MFCC feature vector.

Several types of cepstral coefficients are known, any of which can be used. For example, LPC cepstral coefficients, and there are many ways of computing such coefficients. Those skilled in the art will recognize that any of these can be used in place of MFCCs.

Figure 3:
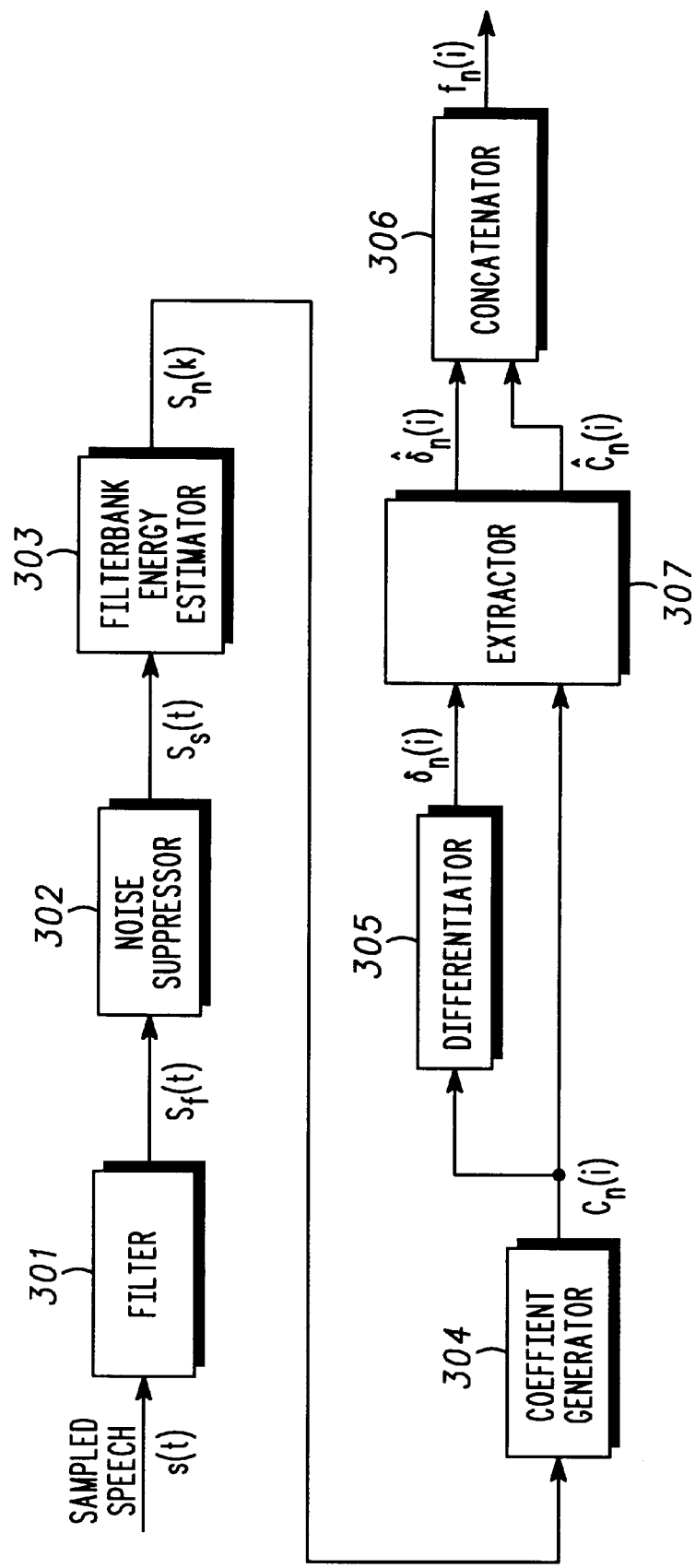
FIG. 3 is a functional block diagram of a feature extraction circuit.

Feature extraction is expanded in FIG. 3 to illustrating an MFCC and delta-MFCC example of feature extraction. Sampled speech (output from analog to digital converter 202) is input to filter 301, where filtering such as pre-emphasis is performed to spectrally flatten the speech signal and remove unwanted portions of the speech spectrum. The filtered signal then enters an optional noise suppressor 302, which suppresses background noise such as engine noise in a hands-free vehicle application. The suppressed output is input to filter bank 303, which performs filter bank energy estimation. The filter bank outputs energy estimates $S_n(k)$ for a filter bank k of M frequency bands for a complete frame of speech, where n is 20 ms of speech data as exemplified in this description.

The filter bank can be based on the Mel-Frequency scale, which is based on a perceptual frequency scale. This scale is linear at low frequencies (e.g., below threshold 1 KHz) and logarithmic above that threshold. The filter bank energy estimates at frame n are then put through a cepstrum coefficient calculator 304. This computes the representative coefficients, which are illustrated herein as ceptral coefficients $C_n(i)$, for a frame n from the filter bank energies as:

$$C_n(i) = \sum_{k=1}^{M} \log|S_n(k)|\cos(\pi(k-0.5)i/M)$$

where i is an index into the cepstral vector and can range from 0 to N, where N+1 is the desired length of the cepstral feature and N+1 is $\leq M$. The cepstral features are then input to a differentiator 305, where the derivatives $\delta_n(i)$ may be estimated, for example by:

$$\delta n(i) = \sum_{k=1}^{D} a_k((c_{n+k}(i) - c_{n-k}(i))$$

$$\text{where } \sum_{k=1}^{D} a_k = 1.$$

Those skilled in the art will recognize that many other ways of calculating cepstral types of features and for estimating their derivatives exist, but these methods are provided by way of example.

The present invention reduces the amount of storage needed for voice recognition systems by reducing the feature vector length without detrimentally impacting on the amount of information available. The inventor found that most adjacent elements of the feature vector are correlated, such that $c_n(i)$ was found to be correlated with $c_n(i+1)$ and $c_n(i-1)$, and $\delta_n(i)$ was found to be correlated with $\delta_n(i+1)$ and $\delta_n(i-1)$. Also, elements in the delta-cepstral feature were found to be correlated with their cepstral feature counterparts, or in other words $c_n(i)$ was found to be correlated with $\delta_n(i)$.

Using this information, a novel feature vector was constructed using 6 cepstral features $cm_n(i)=c_n(2i-1))$ for i=1 to 6, and 7 delta-cepstral features $\delta m_n(i)=\delta_n(2i)$ for i=0 to 6. The extractor 307 removes correlated elements of the feature vector, and leaves these portions of the coefficients output by the coefficient generator 304 and the differentiator 305. As can be seen from the equations, adjacent elements of the feature vector have been removed and one of either $c_n(i)$ or $\delta_n(i)$ has been removed for each i. The resulting feature vector $f_n(i)$ output by concatenator 306 is a subset of both the representative coefficients and the delta coefficients, and can for example be an output vector comprising coefficients $cm_n(i)$ followed by coefficients $\delta m_n(i)$, which represents 13 features instead of 25 in the example, but includes both representative coefficients from coefficient generator 304 and delta coefficients from differentiator 305.

In operation, feature extractor 204 can be advantageously implemented in processor 108 (FIG. 1) which generates the cepstral coefficients as indicated in block 402. The odd coefficients are extracted in extractor 307, as indicated in block 404. The delta-cepstral coefficients are generated in differentiator 305 as indicated in block 406. The even delta-cepstral coefficients are extracted in extractor 307, as indicated in block 408. The feature vector comprising the extracted cepstral and delta cepstral coefficients is output as the feature set. Those skilled in the art will recognize that the delta cepstral odd coefficients and cepstral even coefficients could be used instead.

Some prior art cepstral and delta-cepstral features are concatenated into a single feature vector, dropping the initial cepstral coefficient at this point because it is represents the log-energy in the frame; however, the delta-energy feature $\delta_n(i)$ is left in. In known systems a final feature vector $f_n(i)$ is constructed such that $f_n(i)=\delta_n(i)$, n=0 to N−1, and $c_n(I-N+1)$, i=N to 2N−1 (without $c_n(0)$). For example, an N=12 cepstral transform, the resulting feature vector would be constructed as 13 delta-cepstral elements and 12 cepstral elements, for a total of 25 elements in the feature vector. Those skilled in the art will recongnize that $c_n(0)$ can alternately be left in.

A typical training algorithm according to the prior art requires the feature vectors for 2 or more utterances to be collected before the training can be performed. For the feature vector exemplified herein, if it has a 10 ms frame, in a system allowing up to two second utterances, this would require (25 features/frame * 100 frames/sec * 2 sec/utterance * 2 utterances)=10,000 features which must be stored in volatile memory 110, such as in RAM. Because the amount of storage needed for the feature vectors is directly proportional to the length of the feature vector, for cost sensitive applications, such as cellular phones, this amount of storage can be prohibitively expensive. The present invention optimizes the length of the feature vector, thereby reducing the amount of RAM required during training.

The training 207 generates model parameters for the utterances captured. For most models, including continuous-density HMMs, the vast majority of the model parameters are consumed by feature vector means. For a 12 state HMM using 25 element feature vectors, this requires (12 states * 25 features/state)=300 features to be stored in non-volatile memory (such as flash or EEPROM). Again, for cost-sensitive applications, this can be very expensive memory. By shortening the length of the feature vector to 13, this invention reduces the amount of non-volatile memory required for a speech recognition system.

In tests, the new feature vector gave almost identical recognition results to the full 25 element feature vector. On one database, it degraded performance by about 1%, whereas on another database it yielded the same overall recognition rate. This novel 13-element feature vector required only 52% of the original feature vector RAM storage requirements and 52% of the original NVM storage requirements for the feature vector means in models generated during training. It also significantly reduces the MIPS required in the recognition algorithm.

Figures 4, 5:
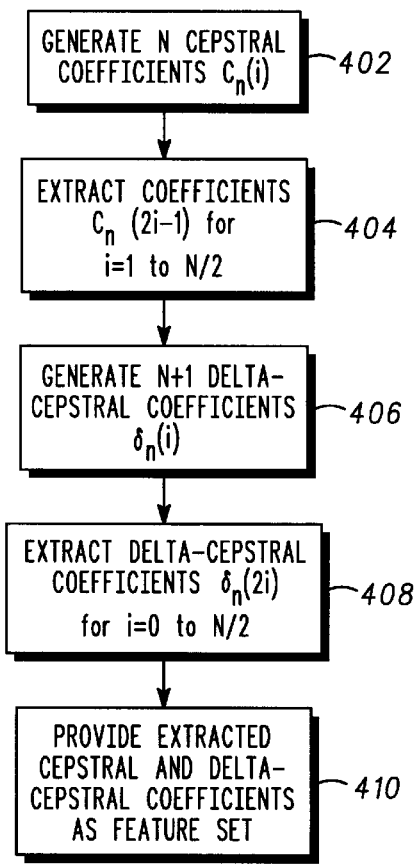
FIG. 4 is a flow chart illustrating a feature extraction algorithm.
FIG. 5 is a chart illustrating performance of a voice recognition system using different methods of reducing the vector length.

Other known methods of reducing the feature vector length to 13 elements are to simply truncate the feature vector (for example, using N=6 instead of N=12), or to not include the delta-cepstral features at all. In quiet operating modes, these methods all yield similar recognition results as shown in FIG. 5. However, when using voice recognition in a noisy hands free car environment, the feature vector generating using the above method significantly outperforms the other truncated and cepstral only feature vectors.

Examples of techniques used to apply frames of an utterance to states of a model are disclosed in copending patent application Ser. No. 09/257,552, entitled METHOD OF TRACEBACK MATRIX STORAGE IN SPEECH RECOGNITION SYSTEM, filed in the name of Jeffrey Arthur Meunier et al. on the same date as this application, and copending patent application Ser. No. 09/256,031, entitled METHOD OF SELECTIVELY ASSIGNING A PENALTY TO A PROBABILITY ASSOCIATED WITH A VOICE RECOGNITION SYSTEM, filed in the name of Daniel Poppert on the same date as this application, the disclosures of which are incorporated herein by reference thereto.

It can thus be seen that a novel feature vector is disclosed which outputs values for use in voice recognition and training that allows good performance with a small feature vector length. The smaller feature set significnatly reduces the number of MIPS and the size of the memory needed to support the voice recognition process.

Although the invention has been described and illustrated in the above description and drawings, it is understood that this description is by way of example only and that numerous changes and modifications can be made by those skilled in the art without departing from the true spirit and scope of the invention. Although the present invention finds particular application in portable wireless devices such as cellular radiotelephones, the invention could be applied to any device employing speech recognition, including pagers, electronic organizers, computers, and telephony equipment. The invention should be limited only by the following claims.

What is claimed is:

1. A method of extracting features for a voice recognition system comprising the steps of:

inputting a digitized signal;

generating representative coefficients from the digitized signal;

generating differential coefficients from the representative coefficients; and selectively using a portion of the representative coefficients and the differential coefficients to construct a feature vector, wherein every other representative coefficient is used in the feature vector.

2. The method as defined in claim 1, wherein the step of generating representative coefficients includese step of generating cepstral coefficients.

3. The method as defined in claim 2, wherein the step of generating differential coefficients includes the step of generating delta cepstral coefficients.

4. The method as defined in claim 3, wherein the cepstral coefficients are output first and the delta-cepstral coefficients are output second.

5. The method as defined in claim 2, wherein the cepstral coefficients are mel frequency cepstral coefficients.

6. The method as defined in claim 1, wherein every other differential coefficient is used in the feature vector.

7. A voice recognition system, comprising:

a microphone for inputting audible sounds;

an analog-to-digital converter coupled to the microphone to output digital signals;

a coefficient generator coupled to the analog-to-digital converter and generating representative coefficients;

a differentiator coupled to the coefficient generator to generate delta coefficients;

and an extractor selectively, outputting a portion of the representative coefficients and the delta coefficients as a feature vector for use in voice recognition, wherein every other representative coefficient is used in the feature vector.

8. A wireless communication device, comprising:

a call processor performing call processing;

a transmitter and a receiver, coupled to the call processor;

a microphone for inputting audible sounds;

an analog-to-digital converter coupled to the microphone to output digital signals;

a coefficient generator, positioned in the call processor and coupled to the analog-to-digital converter, generating representative coefficients;

an extractor, positioned in the call processor, selectively outputting a portion of the representative coefficients and the delta coefficients as a feature vector for use in voice recognition, wherein every other representative coefficient is used in the feature vector.

* * * * *